UNITED STATES PATENT OFFICE.

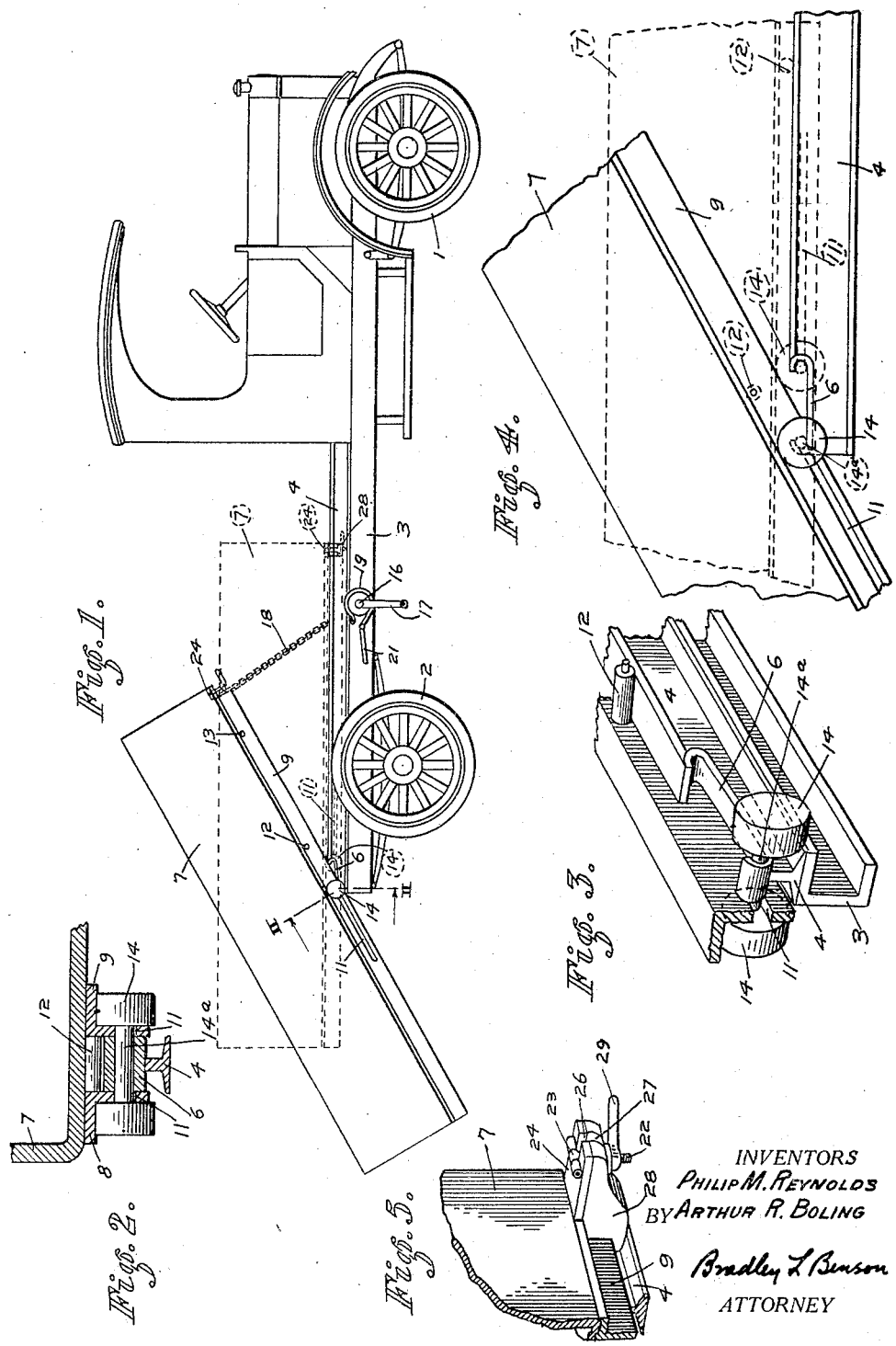

PHILIP M. REYNOLDS AND ARTHUR R. BOLING, OF SAN FRANCISCO, CALIFORNIA.

DUMP-BODY.

1,362,819.  Specification of Letters Patent.  Patented Dec. 21, 1920.

Application filed July 21, 1919. Serial No. 312,430.

*To all whom it may concern:*

Be it known that we, PHILIP M. REYNOLDS and ARTHUR R. BOLING, both citizens of the United States, and residents of the city and county of San Francisco, State of California, have made a new and useful Invention—to wit, Dump-Body; and we do declare the following to be a full, clear, concise, and exact description of the same.

The present invention is an improved dump body and relates particularly to that type of commercial vehicle which is used to transport and unload commodities such as sand, gravel, building material and refuse matter, where it is desirable to unload the entire contents of the body of the vehicle to the ground.

The primary object of the invention is to provide a dump body of such construction that the driver or operator of the vehicle will have perfect control of the dumping, and by the operation of simple mechanism accomplish the dumping operation at any desired speed to accommodate the various commodities.

Another object of the invention is to provide a dump body having a roller bearing contact with the chassis of the vehicle to which it is attached and of such construction that it may be economically and quickly attached to the chassis of any vehicle without disfiguration of the said vehicle and at a minimum cost of production.

Other objects and advantages will appear as this description proceeds.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatsoever form it may be embodied.

In the accompanying one sheet of drawings,

Figure 1 is a side elevation of a motor truck with our improved dump body installed thereon.

Fig. 2 is a sectional elevation of a detail comprising a roller bearing between the body and the chassis of the vehicle.

Fig. 3 is a perspective view showing the part shown in Fig. 2.

Fig. 4 is a fragmentary side elevation of Fig. 1 on a larger scale, showing the body in tilted position in full line and in the loaded position in dotted line.

Fig. 5 is a perspective fragmentary view of our body securing means.

Referring to the drawings, the numeral 1 represents the forward wheel of an auto truck, 2 the rear wheel, and 3 the side sills of the chassis, all of usual construction and forming no part of the present invention. Suitably secured to the side sills of the chassis are two rails or I beams 4, only one of which is shown here, it being understood one I beam is secured to each side of the chassis of the truck. The ends of the I beam 4 at the rear end of the truck are cut or milled away as shown in Fig. 3, and in this cut are welded or suitably secured two C-shaped members made of band metal designated by the numeral 6.

The C-shaped member 6 is preferably inclined rearwardly for purposes which will hereinafter be explained. A dump body 7 of any suitable shape and capacity is secured to the body in the following manner:— Secured to the bottom of the body 7, as shown in Fig. 2, on either side of the said body, are angle irons 8 and 9. It will be understood that a pair of these angle irons 8 and 9 are secured to the nether side of the body on either side of the truck, and the depending flanges of the said angle irons serve as guides to slide the body 7 rearwardly in relation to the chassis of the truck.

The depending flanges of the said angle irons 8 and 9 on both sides of the truck are provided with slots 11. These slots are disposed intermediate the length of the angle irons at a point best adapted to serve the following purposes:—It is desired to slide the body rearwardly relative to the truck and the slots are so placed and are of sufficient length that when the roller bearings hereinafter mentioned, traverse the said slots the center of gravity of the load in the body 7 will incline the body to a dumping position. Suitable rollers are provided which are journaled in the angle irons as indicated at 12—13. We also provide rollers 14. The rollers 14 are provided with an axle member 14$^a$ which is adapted to traverse the C-shaped band metal members welded in the I beams 4. The roller 14 may be integral with the axle 14$^a$ or suitably keyed thereto. The object which we wish to accomplish is to provide a roller having two different diameters, the smaller or axle 14ª diameter being approximately one-third that of the roller 14. The purpose of this construction is to provide a means whereby, when the axle 14ª traverses the length of the C-shaped slots 6 the body will be carried approximately three times that distance because of the greater diameter of the rollers 14 which bear against the horizontal flanges of the angle irons 8 and 9, as shown in Fig. 2. Obviously, to accomplish this, the slots 11 must be at least three times the length of that of the slots in the member 6.

The purpose of the rollers 14 is three fold, first:—They serve as rollers to provide a movement of the body relative to the truck, second, as a fulcrum or pintle of a hinge, over which the inclined body of the dump wagon is inclined, as shown in Fig. 1, and third, to act as a lock when the body is in the forward or dotted position shown in Fig. 1 because of the fact that the rear end of the slots 11 and the forward end of the member 6 simultaneously engage the axle 14ª of the roller.

In order to manually operate the body 7, we have provided the following mechanism:—Suitably journaled in the chassis 3 is a cross shaft 16 which is provided with a suitable crank 17 attached thereto. Secured to this cross shaft 16 are chains 18, the opposite ends of which are suitably secured to the depending flanges of the angle irons 8 and 9. By this means when the body is in the loaded or dotted position shown in Figs. 1 and 4, if the crank be rotated, the body will be drawn rearwardly in relation to the chassis, rolling on the rollers heretofore mentioned until it reaches a point where it will be overbalanced, as shown in Fig. 1, at which point the chains are taut and by rotating the crank, the forward end of the body may be raised slowly and the rearward end lowered as slowly as the case demands. In order to have perfect control of this dumping operation, we provide a band brake 19 controlled by a pivot handle 21 of well known construction.

To reseat the body after the load has been delivered to the ground, it is necessary to rotate the handle 17, whereupon the forward end of the body 7 will be drawn down into contact with the rails 4, where it can be manually moved forward to the seated position. In order to keep the body in the seated position, we have provided bolts 22 threaded at one end and pivoted at the opposite end, as shown at 23, to a plate 24 suitable secured to the body 7 at a point directly in front of the forward ends of the angle irons 8 and 9. The member 24 is provided with a slot 26 which registers with a slot 27 in a cross brace 28 suitably secured to the chassis, it being understood that this registering occurs only when the body is forward in the seated position and the slots and pivoted bolts form a means for keeping the body in said position. The bolt 22 is provided with a handle nut 29 which securely engages the body in seated position.

Having thus described our invention what we claim as new and desire to secure by Letters Patent of the United States is as follows:—

1. In a dump wagon, the combination of a vehicle, parallel I-beams mounted thereon, inclined C-shaped members carried by and forming the rear end of said I-members, parallel angle irons mounted upon the underside of the vehicle body, rollers carried by said angle irons and adapted to roll upon said I-beams, slots formed in said angle irons, and rollers of different diameter adapted to co-act between said angle irons and said C-shaped member to form a traveling fulcrum for said vehicle body.

2. In a device of the character described, the combination of a vehicle body having parallel angle irons mounted on the underside thereof, rollers mounted between the forward ends of said angle irons, traveling rollers contacting with the underside of said angle irons, said last mentioned rollers being connected by a shaft passing through slots in said angle irons, a vehicle having a C-shaped member upon which said shaft is adapted to roll, and means for causing movement of said body relative to said vehicle.

In testimony whereof we have hereunto set our hands at San Francisco, California, this 21st day of June, 1919.

PHILIP M. REYNOLDS.
ARTHUR R. BOLING.